United States Patent [19]

Schwartzman

[11] Patent Number: 4,844,677
[45] Date of Patent: Jul. 4, 1989

[54] LOCKING DEVICE
[76] Inventor: Gil Schwartzman, 1025 Old White Plains Rd., Mamaroneck, N.Y. 10543
[21] Appl. No.: 207,765
[22] Filed: Jun. 16, 1988
[51] Int. Cl.⁴ .............................................. F16B 21/00
[52] U.S. Cl. .................................. 411/512; 411/353; 24/662; 192/79; 188/67; 188/76
[58] Field of Search ................. 411/36, 353, 512, 519, 411/521, 907, 908; 24/30.5 S, 662; 192/79, 80, 81 R, 81 C; 188/67, 76

[56] References Cited
U.S. PATENT DOCUMENTS

| | | | |
|---|---|---|---|
| 423,665 | 3/1890 | Bryant | 24/662 |
| 2,492,115 | 12/1949 | Crowther | 411/353 |
| 2,707,108 | 4/1955 | Schottler | 192/79 |
| 3,264,676 | 8/1966 | Schwartzman | 401/206 |
| 3,394,747 | 7/1968 | Duffy | 411/353 |
| 3,874,563 | 4/1975 | Schwartzman | 222/213 |

FOREIGN PATENT DOCUMENTS 925284 8/1947 France ................................. 24/662

Primary Examiner—Neill R. Wilson
Assistant Examiner—Douglas E. Ringel
Attorney, Agent, or Firm—Cohen, Pontani & Lieberman

[57] ABSTRACT

A locking device is formed of a base, a grabbing member and a plurality of arcuate legs flexibly connecting the base and grabbing member. The grabbing member is operatively deformable by relative movement of the base and grabbing member toward and/or away from relative coplanarity therebetween to thereby expand or contract the grabbing member into or out of releasable locking engagement with a workpiece.

16 Claims, 4 Drawing Sheets

LOCKING DEVICE

BACKGROUND OF THE INVENTION

This invention relates generally to locking devices and, in particular, to a simple, preferably unitary locking device having a wide range of applications.

Locking devices for use as nuts, lock washers, connectors, and fasteners and the like are well known and, for most applications, readily available in a variety of forms. In general, such devices operatively engage a workpiece or workpiece part as by rotation relative to a threaded or unthreaded portion of the workpiece or part or through snap-fit securement thereto. For this purpose, the locking device typically includes a fixed diameter opening through which the workpiece or part, or portion thereof, is releasably or nonreleasably received.

Known locking devices, however, are prone to unintended and unexpected release or disengagement from workpieces to which they are operatively secured. This may result from any of a number of environmental factors such, for example, as vibrations or deformation-inducing stressing of the workpiece, which cause such locking devices to loosen and/or become fully detached from the workpiece.

SUMMARY OF THE INVENTION

Accordingly, it is the desideratum of the invention to provide a mechanical locking device adapted for operative securement to a workpiece and which overcomes the tendancy of prior art devices to unexpectedly loosen or otherwise become unsecured therefrom.

It is a particular object of the invention to provide such a locking device that is operative to convert a linear to a circular force, and a circular to a linear force, for effecting a selectively releasable locking engagement with a workpiece.

Another object of the invention is to provide such a locking device that is adapted for particular utility as a lock washer.

A further object of the invention is to provide such a locking device that is adapted for particular utility as a positive clutch.

Still another object of the invention is to provide such a locking device that is adapted for particular utility as a brake.

Yet another object of the invention is to provide such a locking device that is adapted for particular utility as a snap-on fastener.

Still other objects, features and advantages of the invention will in be apparent, and in some cases will be obvious, from the following disclosure of currently preferred but nonetheless illustrative embodiments of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENTS

The present invention is directed to a locking device for operative and releasable securement to a workpiece. Broadly, the inventive device is comprised of two parts, at least one of which is operatively engageable with the workpiece, which are connected by a plurality of fixed length, arcuate legs. In a particularly preferred form of the invention, the entire device is unitarily fabricated although, as will become apparent, the various elements of the device may alternatively be separately manufactured and then interconnected to form the completed device. In use, the two parts of the locking device are arranged for relative movement—more particularly in directions toward and/or away from coplanarity of the two parts—as a consequence of which at least one of the two parts is predeterminately resiliently deformed into or out of securement with the workpiece. Many different structural forms of the invention, the currently most-preferred of which are described herein, are constructable in accordance with the teachings of the invention.

Figure 1:
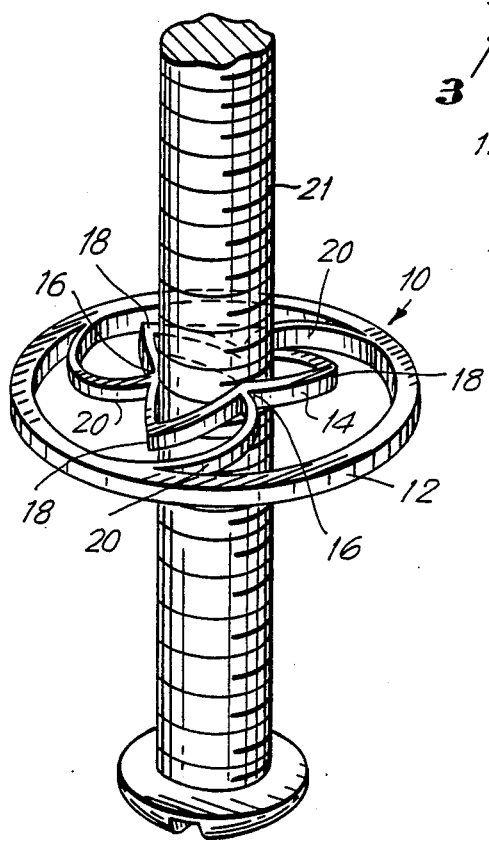
FIG. 1 is a perspective view of a lock washer constructed and arranged in accordance with the invention.
Figure 2:
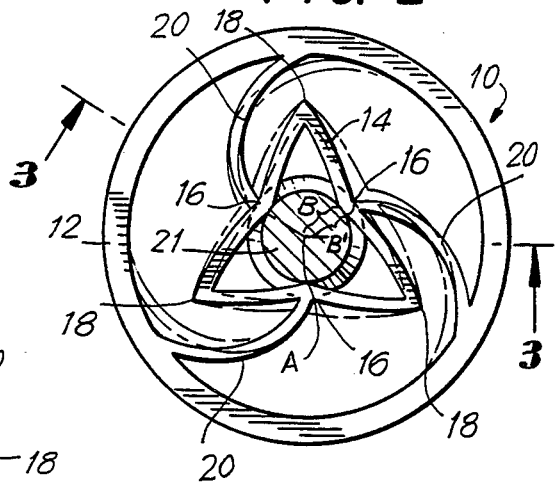
FIG. 2 is a top plan view of the lock washer of FIG. 1.
Figure 3:
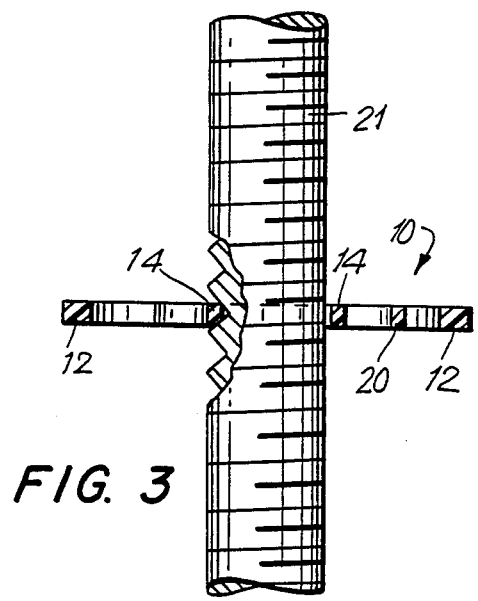
FIG. 3 is a cross-sectional view of the lock washer of FIGS. 1 and 2 taken along the lines 3—3 in FIG. 2.

A lock washer 10 constructed and arranged in accordance with a first embodiment of the invention is depicted in FIGS. 1 to 3. Lock washer 10 includes a circular base 12 and a radially-inwardly disposed, substantially star-shaped ring or grabbing member 14 having an aperture or opening defined therethrough. Base 12 and grabbing member 14 correspond to the two relatively movable parts of the invention to which reference has heretofore been made. In the illustrated form of the lock washer 10, base 12 and ring member 14 are initially substantially coplanar and have a common center point designated by the reference letter A in FIG. 2.

It should be understood that although base 12 is depicted as generally circular in this embodiment of the invention, it may alternatively be configured in the form of any preferably regular, or less preferably irregular, geometric shape. Indeed, those skilled in the art will recognize, as this description proceeds, that it is not the shape of the base 12 that is important but, rather, the positions at which a plurality of legs 20 which connect the base and grabbing members are secured to or depend from the base that affects the operation of the lock washer. More particularly, the intersections of such legs 20 with the base 12 at locations which circumscribe and are substantially regularly spaced about a regular geometric shape provide for a more equal distribution of deforming force to the grabbing member 14; this is the case in respect of each of the exemplary embodiments of the invention herein disclosed.

Grabbing member 14 is, as hereinafter described, configured for operative engagement with a shaft or other workpiece or workpiece part with which a particular application requires that lock washer 10 cooperatively engage. As illustrated in the drawings, the presently preferred form of grabbing member 14—in each, unless otherwise noted, of the embodiments specifically disclosed herein and in others within the scope and contemplation of the invention—comprises a substantially star-shaped member formed of a closed, continuous and generally circular ring having a plurality of alternating radially-outwardly disposed apices and radially-inwardly disposed notches and bounding an aperture or opening therethrough. In a particularly preferred construction, the star-shaped member 14 lies in a substantially flat plane and each of the notches and apices are alternatingly spaced substantially equidistantly about the continuous ring with each notch positioned substantially equidistantly between a pair of adjacent apices. Nevertheless, as should be or become apparent the ring, by way of example and not limitation, need not be fully closed, need not be flat or even planar, and/or need not have sharply defined apices and/or notches. For example, the ring may have a plurality of notches only, with adjacent notches connected by continuously curved arcs or otherwise smoothly defined extensions. Indeed, the range of possible configurational variations of grabbing member 14 is limited only by its required functionality—namely, that it be predeterminately deformable by relative movement of the base and grabbing member for workpiece-engaging locking securement and/or release in accordance with the invention. Thus, the use of the term "star-shaped" both in this specification and in the hereto appended claims should be understood to include those several forms of the grabbing member expressly illustrated in the drawings as well as a wide range of appropriate modifications in shape, appearance and details of construction in accordance with the full scope and contemplation of the invention.

In the lock washer depicted in FIGS. 1 to 3, the preferred form of ring member 14 has a plurality of apices 18 defined on and substantially equally spaced about its circumference. An equal number of notches 16 are also provided on the ring with one such notch positioned at a point substantially equidistant between each pair of adjacent apices. It should be pointed out that although lock washer 10 is depicted as having a grabbing member 14 incorporating three notches and three apices, any greater number of notches and apices may alternatively be provided. Indeed, although not preferred, constructions of washer 10 having only two sets of notches and apices are, for appropriate applications, within the intended scope and contemplation of the invention.

In the illustrated lock washer of FIGS. 1 to 3, the generally centrally-defined aperture or opening is sized for receiving, as hereinafter described, a workpiece such as the threaded shank 21 of a screw-type fastener. As there shown, the ring-bounded opening lies—at least initially—in the same substantially flat surface as the remainder of grabbing member 14, base 12 and arcuate legs 20. Of course, that surface need not be flat. The opening has an initial cross-sectional size which, upon operative relative manipulation of the base 12 and grabbing member 14, increases as the grabbing member predeterminately deforms.

Star-shaped ring member 14 is connected to base 12 by a plurality of preferably evenly spaced apart arcuate legs 20 of fixed and substantially equal length. Legs 20 are initially coplanar with members 12 and 14. Each leg 20 is connected at one end to a respective one of the notches 16 and at its opposite end to base 12. It is also within the contemplation of the invention that, in another form of washer 10, the end of each leg 20 be connected to ring member 14 at a respective apex 18 rather than at a notch 16. In another but currently less preferred form of lock washer 10, each leg 20 may be connected to ring member 14 at a point on the ring located intermediate a notch 16 and an adjacent apex 18.

The connection between base member 12 and each leg 20 defines an angle which may assume a wide range of valves, generally as a matter of design choice but partly dependent on the specific form of and intended application for that particular locking device. Nevertheless, in the lock washer 10—and in many alternate forms of the invention including those several embodiments herein described—it has been found that an angle of approximately 45 provides particularly advantageous operational characteristics and is accordingly preferred. Similarly, although the size of the arc circumferentially traversed by each leg 20—herein referred to as the "wrap" of the leg—is not critical to the proper functioning of the inventive locking device and may therefore assume a wide range of values, a circumferential wrap of approximately 120° is currently preferred in the lock washer 10. In other forms of the invention, particularly 3-dimensional forms such for example as hereinafter disclosed, the circumferential wrap of the legs may optionally be as great as 180° or more, thereby enabling the realization of substantially increased flexibility in the relative movability of the base and grabbing member toward and/or away from coplanarity thereof.

Each of the legs 20 is flexibly formed and configured so that it may be at least partly displaced out of the initially common plane of the base 12 and ring member 14—i.e. out of coplanarity—as the base and grabbing member are relatively moved during operative use of the lock washer 10. Each leg 20 is also fabricated for resilient flexibility so that when such displacement is discontinued the legs resiliently effect a return of the base and grabbing members, and the legs 20, to or toward their original substantially coplanar condition.

As mentioned above, the disclosed lock washer 10 may for example be employed in conjunction with a post-like workpiece or workpiece portion such as the threaded shank 21 (FIG. 1) of a screw-type fastener. Of course, the workpiece portion with which washer 10 is engageable may have a variety of alternate shapes and structural features including, for example, being ribbed or smooth, or having a cross-sectional periphery that is round or otherwise arcuate, or regularly or irregularly geometric. In any event, it is generally intended that the diameter of shank 21 be substantially equal to or slightly greater than the diameter of an imaginary circle inscribable through those points on the interior periphery of ring member 14 immediately inwardly adjacent the plural notches 16—i.e., those points on ring member 14 which constitute the minimum radius B (FIG. 2) of its central opening. Thus, the relative diameters of the workpiece shank 21 and of the said inscribable circle, in the initially coplanar condition of lock washer 10, are such that shank 21 is unable to freely or, preferably, to even frictionally slide or pass longitudinally through the opening in ring member 14.

In use, grabbing member 14 is manually or otherwise moved or displaced relative to base 12 out of their initially coplanar condition. Where shank 21 is threaded, such displacement may be effected by a combination of manipulation of the lock washer 10 and relative rotation of the shank and lock washer. The fixed lengths of arcuate legs 20 cause a relative rotation of the base and grabbing member with such displacement and, in addition, a predetermined deformation of ring member 14 as the notches 16 are drawn radially outward by legs 20, resulting in an increase in the cross-sectional size of the central opening from an initial notch-to-notch or minimum radius B to an enlarged minimum radius B′. Of course, the amount of such enlargement depends upon and generally increases with increasing displacement of grabbing member 14 out of the plane of base 12.

More particularly, displacement of ring member 14 out of the plane of base 12 effects a relatively clockwise rotation of the ring member in the illustrated embodiment—i.e. against the sense (clockwise or counterclockwise) of elongation of legs 20 in their connections from the base 12 to the grabbing member 14. The cross-sectional size of the opening defined in grabbing member 14 is thereby sufficiently increased to permit longitudinal passage or movement of workpiece shank 21 through the opening. When washer 10 reaches its desired position along shank 21, relative rotation of the shank and lock washer is stopped, or said displacement of ring member 14 is otherwise discontinued, the resilient return urgency of legs 20 carries the ring member back substantially to or toward its initially coplanar condition with base 12, and ring member 14 returns to or toward its substantially undeformed condition wherein its central opening has a minimum radius B. In that condition, ring member 14 frictionally or otherwise securely engages the periphery of shank 21 against relative longitudinal movement of the shank which is thereby captively journaled through the ring member opening.

Those skilled in the art will appreciate that other, modified forms of a substantially coplanar lock washer may also be constructed in accordance with the invention. For example, the grabbing member ma be disposed radially outward of the base member such that, as the grabbing member is relatively displaced from its initially coplanar relation with the base, the arcuate legs effect a radially-inward deformation of the grabbing member and a consequent decrease in the minimum radius of the opening therethrough. More to the point, such an alternate construction of lock washer is particularly suited for engagement with the interior periphery of a hollow rim or shoulder or tube, for example, at the peripherally-outward edges of the apices of the star-shaped grabbing member. With appropriate sizing of the grabbing member in respect of the interior peripheral surface of the workpiece which is intended for engagement therewith, such relative displacement of the grabbing member out of its initial coplanar relation with the base member effects a predetermined deformation of the grabbing member sufficient to permit receipt of the grabbing member radially within the workpiece internal periphery; subsequent release of the grabbing member from its displaced and deformed condition causes a radial return or increase in its cross-sectional size for locking engagement of the grabbing member apices against the internal workpiece periphery. This and numerous other modifications too numerous to expressly describe are all within the scope and contemplation of the invention.

FIGS. 4 to 7 depict a second form of the invention, identified by the general reference numeral 22 and having particular utility as a clutch. Clutch 22 is intended, by way of example and as illustrated in the drawings, for operative use in selectively transferring rotational motion of a spline shaft 36 to a driven body 38. In a manner similar to the elemental arrangement of the lock washer 10, clutch 22 includes a generally circular base 26 and a star-shaped ring or grabbing member 28 disposed substantially concentric with base member 26. Base 26 is integrally connected or otherwise secured to driven body 38 and may, if desired, be manufactured as a unitary part of body 38. However, body 38, per se, is not a part of the present invention. Ring member 28 is configured having a plurality of apices 30 and an equal number of notches 32 positioned substantially equidistant between pairs of adjacent apices. Although star-shaped ring member 28 is depicted as having, by way of example, four sets of alternating notches and apices, here again it will be appreciated that a preferred implementation of the invention requires only a minimum of three sets of notches and apice, and that constructions incorporating only two such sets may be employed in appropriate applications. Nevertheless, it is most preferred that the number of notches 32 in grabbing member 28 correspond to the number of longitudinal grooves 34 in spline shaft 36 so as to enhance the operative clutching engagement of the grabbing member with the spline shaft. Numerous other modifications of this embodiment of locking device, some of which have been described in conjunction with the preceeding disclosure of lock washer 10, are also within the scope and contemplation of the invention.

In this embodiment, although ring member 28 and base 26 are substantially concentric, they are positioned in substantially parallel, spaced apart planes and are not therefore initially coplanar as in the preferred construction of lock washer 10. Rather, grabbing member 28 is connected to base 26 by four substantially evenly spaced apart helical legs 24, each connected at one end to one of the apices 30 and at its other end to base member 26. Legs 24 may alternatively be connected to grabbing member 28 at its notches 32 or at other locations on the grabbing member such as, for example, at points intermediate adjacent notch-apex pairs. In a particularly preferred form of clutch 22, each leg is connected to the base at an angle of approximately 45° and has a circumferential or helical wrap of between approximately 120° and 180°.

The base 26 and grabbing member 28 of clutch 22 are relatively movable toward and away from coplanarity thereof along an axis defined through the concentric centers of the base and ring member. In the illustrated embodiment of clutch 22 wherein the base and grabbing member lie in substantially parallel planes, the axis of such relative movement is substantially perpendicular to those planes. Those skilled in the art will nevertheless appreciate that the axis of movement can be otherwise defined in accordance with this and other constructions of and applications for the invention. For example, where the base and grabbing members are nonconcentrically-disposed in substantially parallel planes, the axis of relative movement therebetween still preferably extends along an imaginary line connecting the centers of the base and grabbing members, permitting a generally uniformly distributed grabbing member deforming force to be applied by relative movement of the ring and base and appropriate configuration of the legs 24. Other forms of clutch 22, and of constructions of the invention similar thereto, wherein the base and grabbing means are arranged in nonconcentric and nonparallel planes——and in which therefore other axes of movement may be defined and determined by the configuration and relative flexibility of the arcuate or helical legs 24—are also within the intended scope and contemplation of the invention. In all such cases, relative movement of the base and grabbing members is in a direction toward and/or away from coplanarity of those members.

It should further be understood that a leg need not be connected to each and every apex or notch. Put another way, a locking device in accordance with the invention need not include the same number of legs as there are notches or apices present therein. Although it is preferred that the connection of the legs to the grabbing member be substantially evenly spaced thereabout its circumference so as to facilitate the operative application of a substantially uniform deforming force to the grabbing member, this result is also attainable by, for example, connecting the legs to alternate—such as only every second or third—notches or apices. In such modified forms of the locking device, the ring structures intermediate these leg connections function as hinges for operative expansion and contraction of the ring member.

It is also within the contemplation of the invention that the plural legs connecting the base and grabbing member be neither equidistantly spaced apart no of uniform length. Rather, each of the legs may be configured having a different fixed length and/or a nonuniform width or thickness, and/or have other structural characteristics—including those resulting from selection of the particular material from which the legs are fabricated—so as to permit an appropriate deforming force to be operatively applied to the base and ring member. Thus, although it is desirable in many applications to apply an evenly distributed deforming force to the legs—for which purpose the length, thickness and other structural characteristics of the legs may be appropriately adjusted—other applications in which such a deforming force is specifically intended to be unevenly applied ar also contemplated.

The clutch 22 operates in much the same manner as previously described in connection with the locking washer 10 of the invention. In its initial condition illustrated in FIGS. 4 and 5, legs 24 maintain the base 26 and grabbing member 28 in their normally spaced apart relation and the aperture or opening in member 28 has an initial cross-sectional size. As grabbing member 28 is moved relatively toward base 26—i.e. toward coplanarily of therebetween—legs 24 effect a rotation of the grabbing member relative to the base and a radially inward deformation of the grabbing member. This deformation causes the apices 30 and notches 32 to be carried radially inward thereby reducing the cross-sectional size of the opening in the grabbing member 28. Conversely, relative movement of the grabbing member in the opposite direction from its initial position—i.e. away from coplanarily with the base—causes a corresponding enlargement in the cross-sectional size of the opening.

Figure 4:
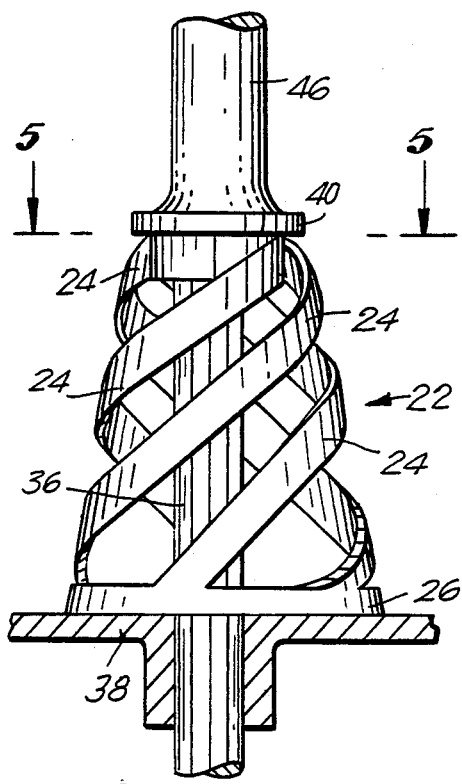
FIG. 4 is a perspective view of a locking device constructed and arranged in accordance with the invention in use as a clutch and depicted, in its disengaged position.
Figure 6:
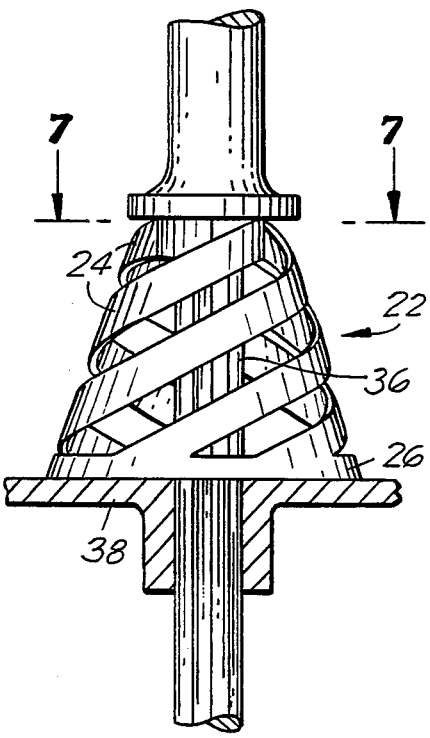
FIG. 6 is a perspective view of the clutch of FIG. 4 depcited in its engaged position.
Figure 5:
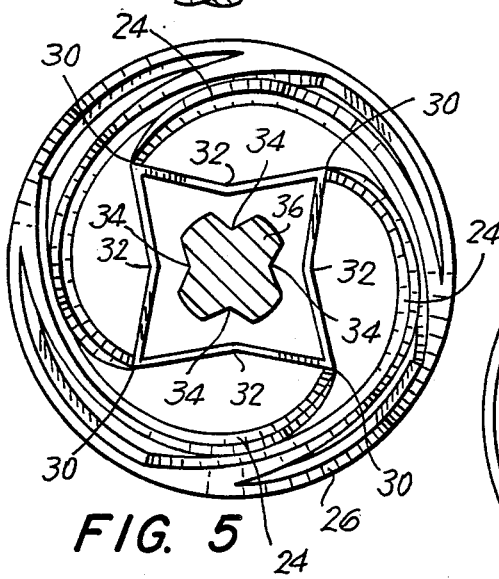
FIG. 5 is a cross-sectional view of the clutch of FIG. 4 taken along the lines 5—5 in FIG. 4.
Figure 7:
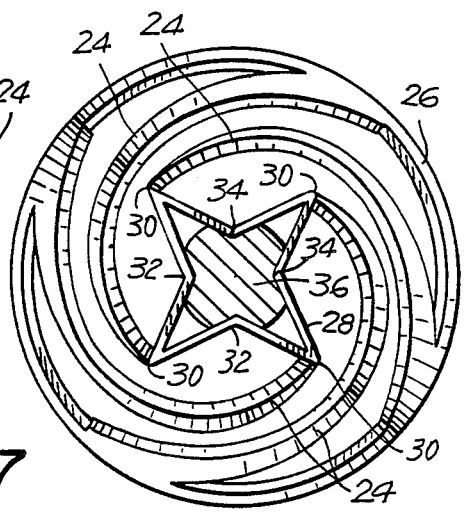
FIG. 7 is a cross-sectional view of the clutch of FIG. 6 taken along the lines 7—7 in FIG. 6.
Figure 8:
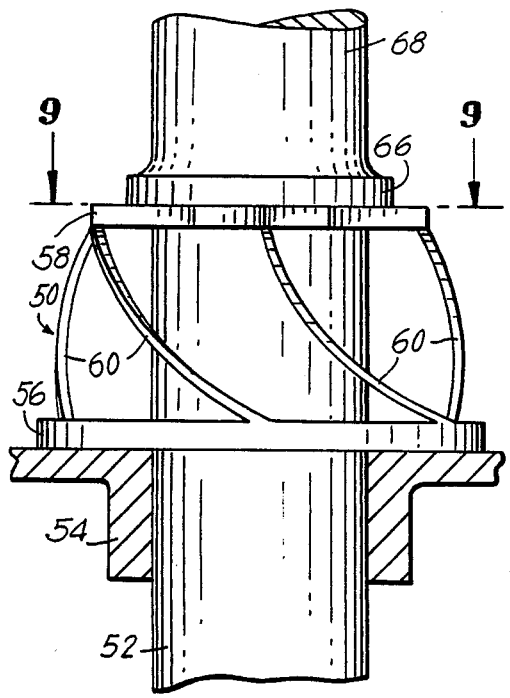
FIG. 8 is a perspective view of a locking device constructed and arranged in accordance with the invention and shown in use as a brake in its disengaged position.
Figure 10:
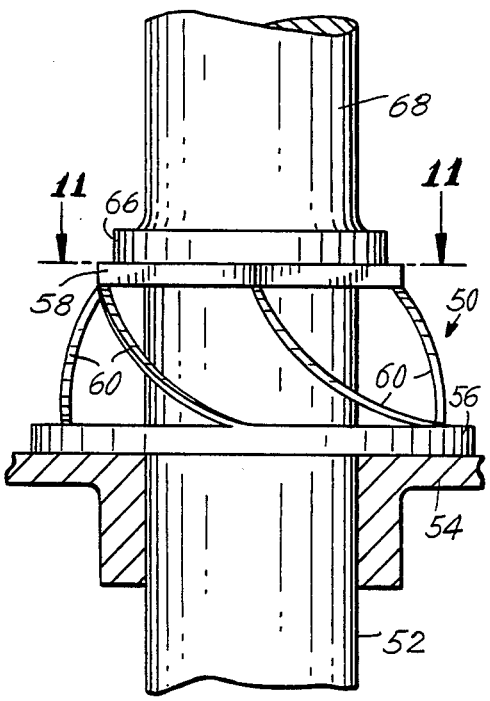
FIG. 10 is a perspective of the brake of FIG. 8 shown in its engaged position.
Figure 9:
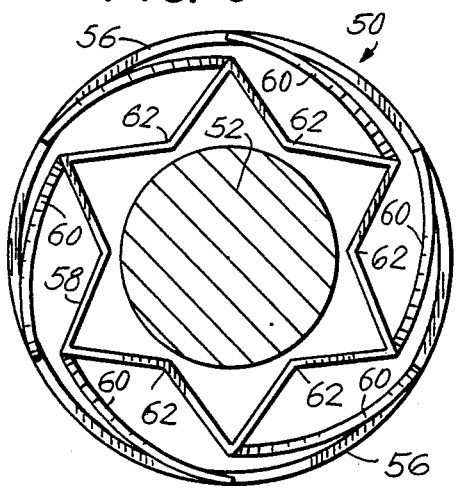
FIG. 9 is a cross-sectional view of the brake device of FIG. 8 taken along the lines 9—9 in FIG. 8.
Figure 11:
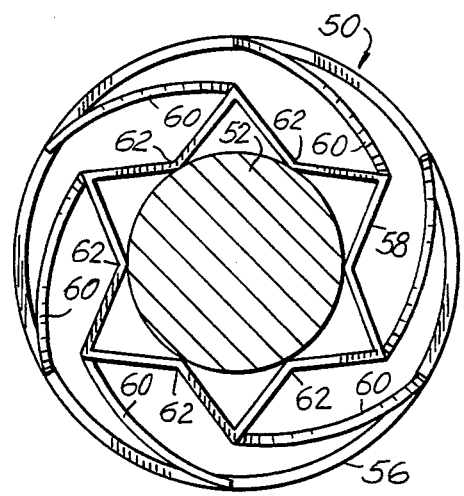
FIG. 11 is a cross-sectional view of the brake of FIG. 10 taken along the lines 11—11 in FIG. 10.

A typical use of clutch 22 for selectively transferring rotation from a rotatively driven spline shaft 36 to a body 38 is shown in FIGS. 4 to 7. Grabbing member 28 is sized so that spline shaft 36 is freely and unobstructively rotatable within the ring member opening when clutch 22 is in its initial or unstressed condition (FIG. 4). Thus, spline shaft 36 is normally free to rotate with respect to body 38, to which the clutch base 26 is secured. However, as the clutch actuating member 46, which may optionally be connected for rotation with spline shaft 36, is longitudinally displaced in the direction of body 38 (i.e. downward in FIG. 4), its end-mounted collar 40 drivingly urges grabbing member 28 toward coplanarily with base 26. Continuation of such movement causes, as above-described, predetermined and increasing reduction in the cross-sectional size of the ring member opening until the interior periphery of the ring at notches 32 contacts the spline shaft periphery and grabbingly engages the longitudinally-oriented grooves 34 radially-inwardly defined in the outer periphery of the shaft 36. Clutch 22, and thus driven body 38, is thereby securely locked to the spline shaft for driven rotation therewith, at least until the driving shaft 46 is sufficiently upwardly retracted to cause the ring member opening to be enlarged out of clutching engagement with the spline shaft and thereby discontinue driven rotation of the body 38 in conjunction with spline shaft 36.

A similar form and related use of a locking device in accordance with the invention is depicted in FIGS. 8 to 11 and identified by the general reference numeral 50. Locking device 50 is particularly adapted for use as a brake operable to stop the rotation of a shaft 52 with respect to a relatively fixed or nonrotatable body 54.

Brake 50 is preferably fabricated in a unitary or otherwise integral form comprising a base 56, a substantially connective and flexibly resilient grabbing member 58, and a plurality of flexibly resilient, generally helical legs 60 connecting the base and grabbing member in normally spaced apart relation. Base 56 may be formed integrally with or otherwise affixed to body 54, and grabbing member 58 has the generally star-shaped and centrally-apertured configuration, including a plurality of alternating notches 62 and apices 64, heretofore illustrated and described in connection with other embodiments of the invention. Of course, grabbing member 58 may take on a variety of alternate constructions including some in which the notches and apices are replaced with gently curved, radially-directed undulations or arcs to maximize the surface area of the grabbing member frictionally engageable with the periphery of shaft 52 as the brake 50 is operatively employed.

Operation of the brake 50 is similar to that of clutch 22. In this case, however, stopping of the rotation of shaft 52 relative to body 54, as the shoulder 66 of an actuator 68 which may, for example, be fixed or otherwise connected to shaft 52, axially displaces grabbing member 58 downwardly (in FIG. 8) toward body 54—i.e. toward its FIG. 10 position—results from the frictional abutment of the grabbing member inner periphery against the outer periphery of the rotating shaft 52 as the cross-sectional size of the grabbing member aperture is reduced. This provides a gradual braking action, the rate of which is controllable through selective control of the rate at and extent to which shaft 52 is displaced toward body 54.

In each of the embodiments of the invention thus far illustrated in the drawings, the grabbing member of the locking device is deformable for engagement with a workpiece or workpiece part which is receivable through the aperture or opening defined in the grabbing member. As heretofore mentioned, however, a locking device in accordance with the invention may alternatively be adapted for operative engagement with the inner periphery of a workpiece into which the deformable grabbing member is received. Such an alternate arrangement is depicted, in relevant part, in FIGS. 12 and 13.

Figure 12:
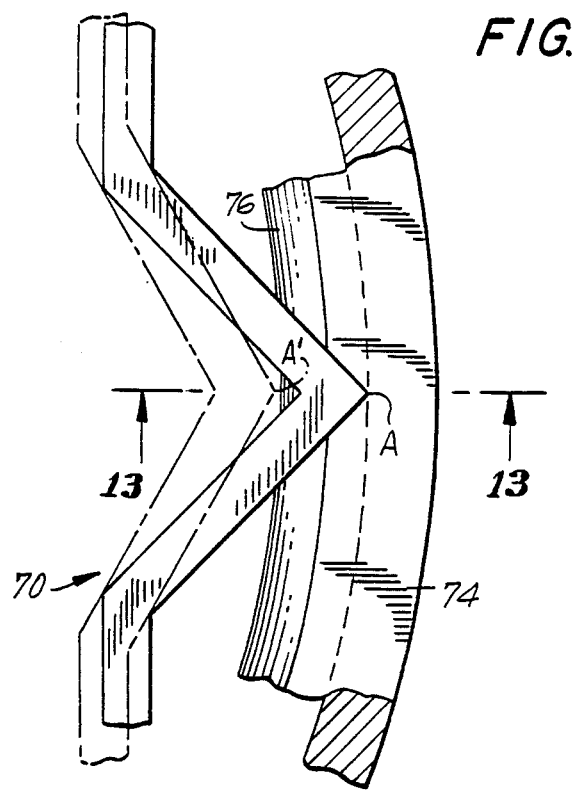
FIG. 12 is a plan view, partly in section, of a snap-on fastener constructed in accordance with the invention.
Figure 13:
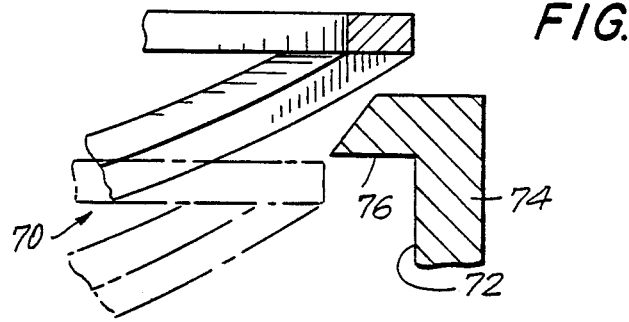
FIG. 13 is a cross-sectional view taken along the lines 13—13 in FIG. 12.

For this purpose, the locking device may, by way of example and not limitation, have substantially the same construction as that disclosed for the clutch 22 or for the brake 50. With particular reference to FIGS. 12 and 13, the locking device 70 is employed as a snap-on fastener for operative, spring-locked and loaded engagement with an interior peripheral wall or recess 72 of a workpiece 74 immediately adjacent a radially-inwardly projecting rim or shoulder 76. It is generally intended that, in its initial or unstressed condition, the outer periphery of the grabbing member is sized so that is apex-to-apex diameter or cross section is larger than the diameter of the interior workpiece recess 72.

As should by now be apparent, snap-on fastener 70 is engageable with the workpiece recess 72 by relatively moving the grabbing member toward coplanarity with the base so as to compressingly deform and reduce the cross-sectional size of the grabbing member ring until its cross-section is smaller than the interior diameter of the recess. The grabbing member is then positionable radially within the recess 72, following which the release of the grabbing member to permit it to resiliently move relatively away from coplanarity with the base causes a ring-enlarging, compression-driven return of the grabbing member toward its original diameter whereby the apices are resiliently driven into spring-loaded engagement against the inner periphery of the workpiece recess 72.

It should be understood that locking devices constructed in accordance with the teachings and any of the various contemplated and modified forms of the invention may be fabricated of any preferably elastically flexible or deformable material. Such materials include, by way of example but not limitation, thermoplastics such as acetal, elastomers, polyethylene, polypropylene, polyvinylchloride and polystyrene and the like, as well as metals such as certain spring steels. And while it is preferred that the locking device be unitarily fabricated or otherwise integrally formed of a single, generally homogeneous material, the various elements and parts of the device may alternatively be manufactured from different materials having similar or different characteristics and then connected to form a locking device in accordance with the invention.

While there have been shown and described and pointed out fundamental novel features of the invention as applied to several preferred embodiments thereof, it will be understood that various omissions and substitutions and changes in the forms and details of the devices illustrated and in their operation may be made by those skilled in the art without departing from the spirit of the invention. For example, constructions having a minimum of only two arcuate legs connecting the base and grabbing member are fully intended. Also contemplated are embodiments of the invention in which both the grabbing member and the base are arranged for aperture-varying deformation thereof in response to relative movement therebetween; such a modified form of locking device accordingly comprises, in effect, a pair of predeterminately-deformable grabbing members connected by a plurality of arcuate or helical, resiliently flexible legs.

Furthermore, in addition to the above-described and suggested utilities as a lock washer, clutch, brake, and snap-fit device, a wide range of additional uses are contemplated for locking devices constructed in accordance with the invention. For example, such a locking device may be used as a centering device for holding wire cable or for packing fragile rods or circular articles, as a lock-ring fastener for snap-on tools and the like, as a grommet for electrical cords, as an adjustable locking device for blinds and awning cords, as a holder for electrical lamp globes, as a stretching device if made of an expanding fabric, or as a removable press-on fastener. In any event, this listing is exemplary only and is not intended to be construed in a limiting sense as numerous additional utilities are also considered to be within the scope of the invention.

It is accordingly the intention that the invention be limited only as indicated by the scope of the claims appended hereto.

What is claimed is:

1. A locking device for operative engagement with a workpiece, comprising:
    a base;
    grabbing means for operatively engaging a workpiece, said grabbing means including a substantially continuous member having a plurality of workpiece engaging portions and bounding an opening having a cross-sectional size; and
    a plurality of arcuate legs connecting said base and grabbing means, each of said legs being resiliently configured so that as the base and grabbing means are relatively moved toward or away from each other said legs effect relative rotation of said base and grabbing means and cause a deformation of said continuous member by which the cross-sectional size of the opening is changed.

2. The device of claim 1, wherein said relative movement of the base away from the grabbing means causes the cross-sectional size of the opening to enlarge.

3. The device of claim 1, wherein the base, the grabbing mean and the arcuate legs are substantially coplanar prior to said relative movement of the base and grabbing means.

4. The device of claim 1, wherein said grabbing means comprises a substantially star-shaped ring member having a plurality of alternating notches and apices defined thereabout.

5. The device of claim 1, wherein said base and grabbing means are maintained in initially spaced apart relation by said arcuate legs prior to said relative movement of the base and grabbing means.

6. The device of claim 5, wherein said base and grabbing means are disposed in substantially parallel planes.

7. The device of claim 1, wherein said base and grabbing means are substantially concentric.

8. The device of claim 5, wherein said base and grabbing means are substantially concentric.

9. The device of claim 5, wherein said plural arcuate legs helically connect said base and grabbing means.

10. The device of claim 1, wherein said workpiece engaging portions comprise a plurality of notches defined in the substantially continuous member of said grabbing means.

11. The device of claim 1, wherein said workpiece engaging portions comprise a plurality of apices defined in the substantially continuous member of said grabbing means.

12. The device of claim 1, wherein said substantially continuous member comprise a plurality of alternating notches and apices and said grabbing means comprises either said plural notches or said plural apices.

13. The device of claim 1, said connection of each of said plural arcuate legs to said base being at an angle of approximately 45 degrees.

14. The device of claim 1, wherein each of said arcuate legs has a circumferential wrap of approximately 120 degrees.

15. The device of claim 1, wherein said connection of each of said plural legs to base is at an angle of approximately 45 degrees, and each said leg has a circumferential wrap of approximately 120 degrees.

16. A locking device operable for releasable engagement with a workpiece, comprising:
   a base;
   substantially continuous means deformable for releasably engaging a workpiece and defining an opening having a cross-sectional size;
   a plurality of arcuate legs of substantially fixed length and resiliently connecting said base and deformable means for relative displacement between said base and deformable means such that relative movement of said means in a first direction toward coplanarity with said base effects relative rotation of said means in a first sense and deformation of said means causing a decrease in the cross-sectional size of said opening, and such that relative movement of said deformable means in a second direction away from coplanarity with said base effects relative rotation of said means in a second sense and deformation of said means causing an increase in the cross-sectional size of said opening.

* * * * *